United States Patent [19]

Böhnensieker

[11] Patent Number: 4,623,449
[45] Date of Patent: Nov. 18, 1986

[54] APPARATUS FOR THE SEPARATION OF THE REUSABLE PART FROM THE UNUSABLE PART OF GRANULAR FORM FILTER MATERIAL, IN PARTICULAR OF GRANULAR FORM ACTIVATED CHARCOAL, FROM FILTER EQUIPMENT

[76] Inventor: Franz Böhnensieker, Vom Stein-Strasse 27, D-4834 Harsewinkel, Fed. Rep. of Germany

[21] Appl. No.: 592,093

[22] Filed: Mar. 22, 1984

[30] Foreign Application Priority Data

Apr. 8, 1983 [DE] Fed. Rep. of Germany ....... 3312612

[51] Int. Cl.$^4$ .............................................. B07B 1/22
[52] U.S. Cl. .................................... 209/250; 209/284; 209/288; 209/295
[58] Field of Search ............... 209/250, 284, 286, 288, 209/294, 295, 270, 362; 210/402, 403

[56] References Cited

U.S. PATENT DOCUMENTS

| 997,185 | 7/1911 | Fasting | 209/362 X |
|---|---|---|---|
| 1,069,244 | 8/1913 | Ford, Jr. | 209/284 |
| 1,528,983 | 3/1925 | Montgomery | 209/250 |
| 2,245,650 | 6/1941 | Christopherson | 209/284 X |
| 4,058,868 | 11/1977 | Champion | 209/250 X |
| 4,251,356 | 2/1981 | Harte | 209/250 |
| 4,426,289 | 1/1984 | Svehaug | 209/284 X |

Primary Examiner—Richard L. Chiesa
Attorney, Agent, or Firm—Birch, Stewart, Kolasch & Birch

[57] ABSTRACT

Apparatus for the separation of the reusable part from the unusable part of granular form filter material from filter equipment, particularly granular form activated charcoal, comprising a base frame; a sieve drum for sieving of the granular form filter material rotatably mounted on the base frame; means for driving the seive drum; and means for pneumatically withdrawing the granular form filter material from the filter equipment and supplying the filter material to the sieve drum.

4 Claims, 4 Drawing Figures

APPARATUS FOR THE SEPARATION OF THE REUSABLE PART FROM THE UNUSABLE PART OF GRANULAR FORM FILTER MATERIAL, IN PARTICULAR OF GRANULAR FORM ACTIVATED CHARCOAL, FROM FILTER EQUIPMENT

BACKGROUND AND SUMMARY OF THE INVENTION

The invention relates to apparatus for the separation of the reusable part from the unusable part of granular form filter material from filter equipment, particularly the reusable part from the unusable part of granular form activated charcoal.

An area of use of filter equipment based on activated charcoal granules is, for example, in printing in which it works with solvent-containing dyes. The printed article is led through a drying apparatus after the printing process, where the solvent evaporates under supply of warmer air. The air laden with solvent is passed into the filter equipment in order to filter out the solvent from the air. After a certain working time, the filter material, i.e. the activated charcoal, becomes saturated and the solvent must be driven off from the filter material by steam or the like. The solvent material driven off can then, if desired, be recovered by a subsequent distillation process. Through the constant change between filtering out of the solvent from the air and driving the solvent out from the filter material by steam, in the run of time increasingly more grains of the activated charcoal granules decay whereby the filter process is considerably diminished and, moreover, the pressure of the steam must be raised in order to drive off the solvent from the granules. From time to time the granules must be therefore taken out of the filter equipment and separated into reusable and unusable parts. For this one has since long ago sucked the granules out of the filter housing by means of a suction device and accumulated then on the ground. The accumulated granules were then thrown by means of a hand shovel against an inclined flat sieve, in order to sieve out the smaller particles from the granulate material. Through the fact alone that the activated charcoal granules withdrawn from the filter equipment were first of all thrown onto the floor and were then hurled against a sieve by means of a shovel, a large amount of broken grains arose, whereby the proportion of non-reusable granules considerably increased. Moreover the work connected with the sieving is extraordinarily time consuming and accompanied by a considerable discharge of dust into the environment. Additional difficulties arise in that the filter equipment as a rule is arranged not in readily accessible places.

A separating or sieving apparatus is also known in which granular form filter material is transferred by hand or through a supply device onto a reciprocating riddle for separation into the reusable and unusable parts. Because of the high relative movement between riddle and granulate form filter material, this is subject to high abrasion similar to working with an inclined flat sieve.

The underlying object of the invention is to provide an apparatus of the kind set out in the introduction with which the granular form filter material, particularly activated charcoal granules can be withdrawn from the filter equipment and effectively separated into unusable and reusable parts in a more gentle and environmentally acceptable manner and also with less expenditure of work. The apparatus should further have a simple and robust construction and meet the requirement of ensuring rapid deployment in inaccessible places.

The apparatus according to the invention for separation of the reusable part from the unusable part of granular form filter material from filter equipment is characterised by a base frame, a sieve drum for sieving of granular form filter material rotatably mounted on the base frame, means for driving the sieve drum and means for pneumatic withdrawal of granular form filter material from the filter equipment and for feeding the material to the sieve drum.

The apparatus for pneumatic withdrawal of granular form filter material from the filter equipment and for the feeding of the material to the sieve drum can, according to a further aspect of the invention, include a suction container arranged on the base frame with an inlet opening for reception of granular form filter material from the filter equipment and an outlet opening in working connection with the sieve drum, means for closing and opening the outlet opening, and means for producing a reduced pressure in the suction container and creating a suction force on the inlet opening during the time in which the outlet opening is closed. The pressure reduction pump as well as a flap for closing the outlet opening of the suction container can be periodically operated by means known per se so that the flap is closed during the time in which the pressure reduction pump is in use and the flap is open during the time in which the pressure reduction pump is out of use.

Through alteration of the suction force of the pressure reduction pump and/or the time during which the suction force acts on to the inlet opening of the suction container or the outlet opening of the suction container is closed, the amount of charge of granular form filter material withdrawn from the filter equipment and fed to the sieve drum can be adjusted.

In order to be able to alter or adjust the throughput speed through the sieve drum of the filter material, the longitudinal inclination of the sieve drum and/or the rotational speed can be altered. For this purpose a sub-frame can be pivotally mounted on the base frame, in which sub-frame the sieve drum is journalled rotatably, and the sieve drum can be driven by, preferably, a variable speed motor driven by air pressure.

By adjustment of the longitudinal inclination and/or the rotational speed and/or the amount of granular form filter material charged to the sieve drum per unit time, optimal sieving conditions for gentle and effective treatment of material can be obtained.

A preferred alternative embodiment of an apparatus built according to the invention is characterised by a base frame, a sieve drum rotatably mounted on the base frame, the longitudinal inclination of the drum relative to the base frame being adjustable; means for driving the sieve drum with variable rotational speed, conduit means, which is in working connection with the sieve drum at one end and, at the other end, is connected to suction/pressure supply means for pneumatic withdrawal of granular form filter material from the filter equipment and production of a flow of pressure medium through the conduit means, in order to move the withdrawn granular form filter material under pressure through the conduit means to the sieve drum, means arranged on the base frame between the conduit means and the sieve drum for creation of an increased flow cross section for the granular filter material, in order to move this with reduced speed to the sieve drum, and means for adjustment of the amount of filter material withdrawn and fed to the sieve drum per unit time.

This embodiment of the invention makes possible,- whilst maintaining gentle handling of the granular form filter material or active charcoal, a continuous withdrawal of material from the filter equipment and continuous processing of it in the sieve drum. Because of the supply of filter material from the filter equipment to the sieve drum by means of a pressure air flow, an effective longer extent of path can be bridged without problems and without loss.

BRIEF DESCRIPTION OF THE DRAWINGS

The invention will be explained further by way of exemplifying embodiments with reference to the drawings. These show.

DETAILED DESCRIPTION OF THE INVENTION

Figure 1:
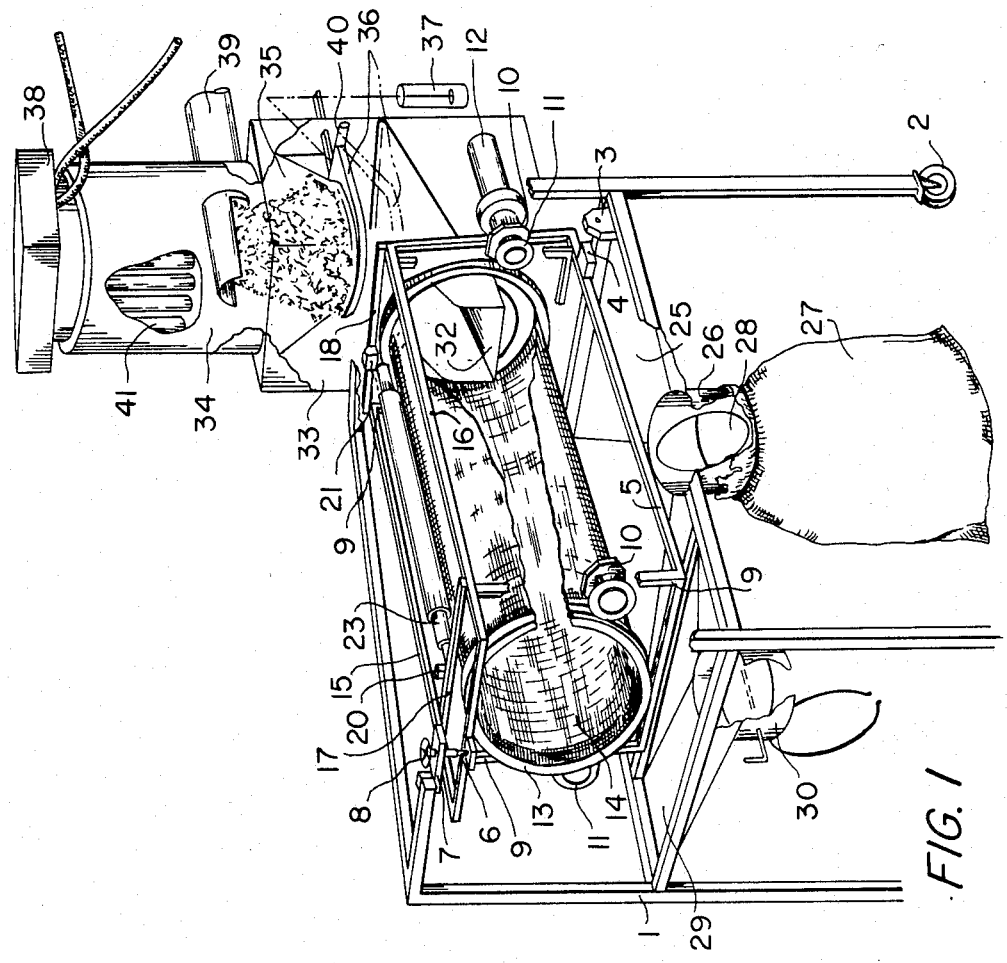
FIG. 1 a perspective view of an apparatus built according to the invention and according to a first embodiment, FIG. 2 a perspective fragmentary view of a cleaning roller and an associated bearing device for the apparatus of FIG. 1, FIG. 3 a perspective view of an apparatus built according to the invention and according to a second embodiment, FIG. 4 a longitudinal sectional view through a suction/pressure jet supply device of the apparatus of FIG. 3.
Figure 2:
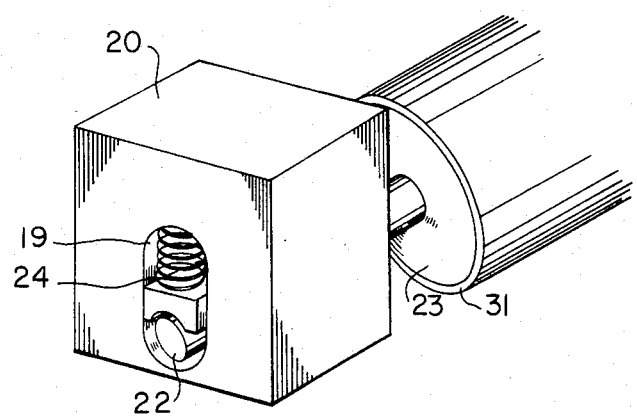

The apparatus for the separation of the reusable part from the unusable part of granular form filter material from filter equipment shown in FIGS. 1 and 2 and according to the first embodiment of the invention includes a movable base frame 1, which is supported on wheels 2 of which only one is shown in FIG. 1. On the opposed horizontal longitudinal struts of the base frame 1, trunnions 3 are fastened, as shown. These hold a swivel shaft 4 on which an end of an inner sub-frame 5 is fastened so that the sub-frame 5 can be swung relative to the base frame 1 in the vertical direction. At the diagonally opposite upper end region of the sub-frame 5 with respect to the shaft 4 an adjustable spindle 6 in screw engagement is positioned. This is held in a plate 7 fastened on the base frame 1 and can be turned by a hand wheel 8 in order to adjust or alter the inclination of the sub-frame 5 with respect to the base frame 1.

On the four perpendicular struts at the corners of the sub-frame 5 near the open end of a sieve drum 14 arranged in the sub-frame, supports 10 are fixed, on which four running rollers 11 are journalled. At least one of the running rollers 11 is driven by a motor 12, for example an explosion proof air pressure motor. The spacing of neighbouring rollers 11 is smaller than the diameter of the rolling circles 13 which are supported on the running rollers and of which each is secured at the front and rear end region of the sieve drum 14 around the outer circumference thereof. The sieve drum 14 is, as shown, open at both axial ends and is held rotatable in the sub-frame 5 by the running rollers 11. The running surfaces of the running circles 13 are preferably formed concavely, in order to fix the axial position of the sieve drum with respect to the sub-frame 5.

According to FIGS. 1 and 2 the upper pair of horizontal longitudinal struts 15 and 16 of the sub-frame 5 is bridged by two cross braces 17 and 18 separated in the longitudinal direction of the sub-frame. These braces are each provided with a hole 19 receiving a bearing member 20 or 21. In the holes 19 the bearing pieces 20 and 21 grip the end portions 22 of a cleaning roller 23 which presses from above onto the outer circumference of the sieve drum 14 through a spring device in the form of, for example, a compression spring 24. The cleaning roller 23 extends in the longitudinal direction of the sieve drum 14 and has the object of pressing the granulated particles collected in the sieve openings of the sieve drum during the sieving process to the interior of the sieve drum 14. Preferably, the cleaning shaft 23 is provided with a covering 31 of an elastic material such as rubber.

As shown, a collecting tank or a collecting funnel 25 is arranged on the main frame 1 underneath the sieve drum 14, into which tank or funnel the sieved granulated particles with the least particle size fall. The collecting funnel 25 has an outlet tube 26 at its lower end, on which, as shown, a sack 27 for reception of sieved granulate particles can be fixed. Preferably, the outlet tube 26 is provided with a flap 28 operable by hand or by a piston and cylinder arrangement and with which the opening in the outlet tube 26 can be closed.

The reusable granules with a prescribed particle size leaving the sieve drum 14 through its free open end fall in a collecting funnel 29 having an outlet tube 30 and being arranged in the base frame 1 underneath the said end of the sieve drum 14. The tube 30 can likewise be closed by a flap. For the easy securement of a sack on the tubes 26 and 30, these can be provided in a known manner with clamping loops of which one is shown on the outlet tube 30.

A discharge funnel 32 of a reception container 33 fixed on the base frame 1 partially extends into the open inlet end lying opposite the free open outlet end of the sieve drum 14. Upon the container 33 a suction or collection container 34 is positioned as shown. The suction container 34 has a lower conical outlet or emptying tube 35 which projects into the reception container and can be closed by a flap 36. The flap 36 is fixed on a shaft 40 which can be turned by hand or, preferably, by a pneumatic piston and cylinder device 37 in order to swing the flap between its open and its closed position. The shaft 40 is journalled in a suitable manner in oppositely-lying side walls of the suction container 34.

On the suction container 34 a pressure-reducing pump 38 is arranged, which, when the flap 36 is closed, produces a sufficiently reduced pressure in the suction container 34 to move the granular form filter material or the activated charcoal granules from the filter equipment into the suction container 34 by means of suction through a suction tube 39. For the purification of the ambient air an air filter, for example in the form of the filter rods 41 shown, is provided between the pressure reducing pump 38 and the interior of the suction container 34.

During the time period in which the pressure reducing pump 38 produces a reduced pressure in the suction container 34 at the closed flap 36, the filter material to be purified moves from the filter equipment into the suction container 34 through the suction tube 39. As shown, the material lies on the closed flap 36. After a suitably determined time period the pressure reducing pump 38 is switched off by a control arrangement (not shown) or by hand and the flap 36 opened. The filter material collected in the suction container 34 falls then onto the discharge funnel 32 and is led by this into the sieve drum 14, which can be set into rotational movement by the motor 12 and the rollers 11. According to the composition of the filter granules to be sieved, the inclination of the sieve drum 14 can be altered by the hand wheel 8 and/or the rotational speed of the sieve drum can be adjusted by means of the motor 12. The granulate part with the smallest particle size falls through the sieve openings in the sieve drum 14 into the collecting funnel 25 and can then from there be drawn off through opening of the flap 28 into a sack 27 fitted to the tube 26 of the collecting funnel. The reusable granules with suitable particle size leave the sieve drum 14 at the outer open axial end and fall into the collecting funnel 29, from where they can fill a sack through the outlet tube 30.

The process of sucking in granular form filter material from the filter equipment into the suction container 34 and the supply of the filter material collected in the suction container 34 into the sieve drum 14 under corresponding control of the pressure reducing pump 38 and the opening and closing movement of the flap 36 can be repeated until the whole of the granulate material in the filter equipment has been sieved.

The whole apparatus, consisting of the base frame 1, the sub-frame 5 pivotable relative to the base frame 1, the sieve drum 14 rotatably mounted in the sub-frame 5, the reception container 33 with the collecting funnel 32 as well as the suction container 34 with the pressure reducing pump 38 and further accompanying equipment including the necessary control equipment is movable as a moblie unit to the place of use next to the filter equipment whose granular form filter material is to be sieved. Since the apparatus according to the first embodiment of the invention works through suction action of the filter material into the suction container 34, the connection 39 between the suction container 34 and the filter equipment should be as short as possible for the avoidance of pressure loss.

Figure 3:
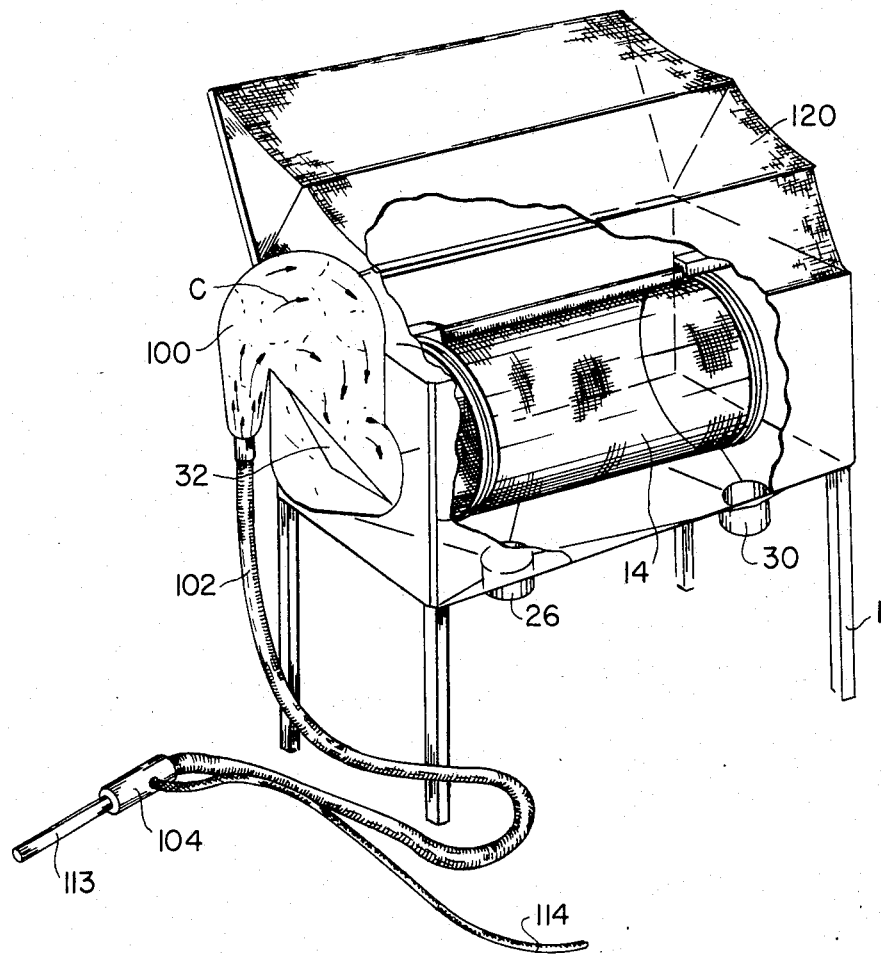
Figure 4:
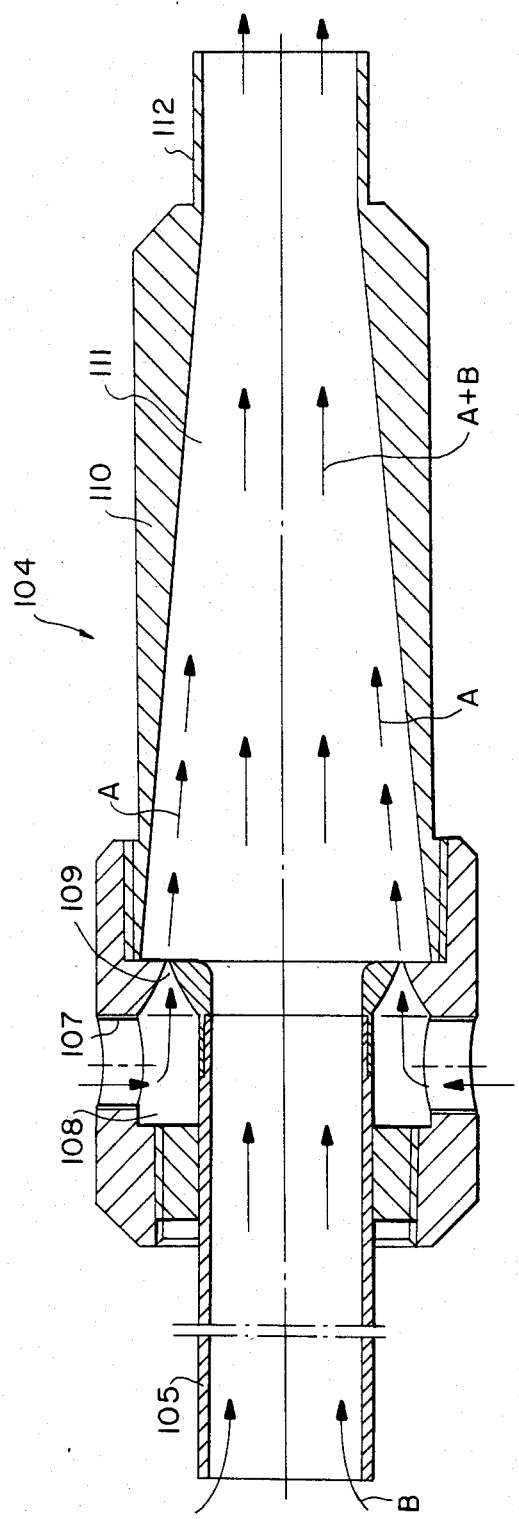

A second embodiment of the invention is shown in FIGS. 3 and 4. This embodiment is distinguished from that described before principally in the way and manner in which the granular form material from the filter equipment is withdrawn and led to the sieve drum 14. The original components of the apparatus according to the second embodiment correspond essentially to the first embodiment and a new description is therefore unnecessary.

In the embodiment according to FIG. 3 the granular form filter material to be sieved is moved by suction power along only a very short portion of the total length of the total supply path and is otherwise moved by a pressurised air stream to the sieve drum. The suction container 34, with the pressure reducing pump arranged on it, necessary in the embodiment described above can therefore be removed and a continuous supply of filter material to be sieved can be effected. Moreover, it is possible with the arrangement of Figs. 3 and 4 to move the granular form filter material to be sieved over a considerably longer supply distance without impairment of the effectiveness of supply.

According to FIG. 3 the filter material is withdrawn from the filter equipment by means of a combined suction/pressure flow supply device 104 which will now be described in detail in connection with FIG. 4. From the supply device 104 the granular form filter material passes through a conduit device or hose 102 and a device 100 arranged on a base frame 1 on top of the discharge funnel 32, the device 100 providing an increased flow cross section for the filter material so that its speed is reduced with corresponding minimization of the abrasion, before the filter material reaches the sieve drum 14. The apparatus 100 further effects a dispersion of the fed-in filter material, as indicated by the arrows in FIG. 3.

The suction/pressure flow supply device 104, with which the filter material is withdrawn from the filter equipment and fed into the hose 102, is shown in detail in FIG. 4. A supply device 104 includes a basically ring-shaped main body 106 in which two tube-shaped parts 105 and 111 in axial alignment are so fixed, for example by screw couplings or the like, that the parts together from a through passage for granular form filter material with an inlet and an outlet. A suction snout 113, through which the granular form filter material form the filter equipment can be sucked, can be secured to a first inlet end of the through passage or the tube-shaped part 105 as shown in FIG. 3. In the region of the other or inner end of the tube-shaped part 105, the part 105 is encircled by a annular space 108, which is formed in the main body 106 and is accessible through one or more openings 107 in the main body 106 from outside. Through the openings 107 and the hose 114 in connection therewith (see FIG. 3), a pressure medium, for example pressurised air, from a source of pressure medium, for example a pump can be led into the annular space 108.

A narrow annular gap 109, which is in connection with the annular space 108, is formed in a annular connection jutting radially inwardly from the internal circumference of the main body 106 so that the pressure medium fed into the annular space 108 can be fed in the axial direction in the tube-shaped part 110. This pressure medium produces an axial driving force in the tube shaped part 110 which is indicated in FIG. 4 by the arrows A and extends in the direction of the outlet end of the through passage. At the outlet end of the through passage, or at the other end of the tube-shaped part 110, an outlet tube 112 on which the hose 102 can be fixed can be provided.

The diameter of the inner space 111 of the tube-shaped part 110 widens, for example conically, in the direction of the inner end facing the tube-shaped part 105, so that the tube-shaped part 110 has a larger inner diameter at its inner end than the neighbouring end of the tube-shaped part 105. The end surface of the tube-shaped part 110 protruding from the outer circumference of the tube-shaped part 105 is enclosed by the annular connection protruding inwardly form the main body 106 with the annular gap 109 formed therein.

The driving flow A led-in through the annular gap 109 into the inner space 111 of the tube-shaped part 110, which flow extends in the direction of the outlet end 112 of the tube-shaped part 110, travels with the air which is inside thespace 111, see arrow B in FIG. 4. The air flow working through the length of the through passage of the supply device 104 provides a suction force on the inlet end of the device 104 and a pressure force at the outlet end, so that the granular form filter material is drawn in through pressure action into the supply device 104 and can be moved with increased pressure through the hose 102 to the sieve drum 14.

The suction force and the pressure flow in the suction/pressure flow supply device 104, and consequently the amount of filter material led to the sieve drum 14 per unit time, can be altered by adjustment of the width of the annular gap 109 and/or of the inner space 110 of the tube-shaped part 110, and/or by the pressure and/or the amount of the pressure medium led into the supply device 104.

The sieve drum is preferably put in a housing with an open upper side. In order to prevent pollution of the surroundings by escape of pressurised supply air, a filter 120 of large surface area, for example of a textile material, is arranged on the open upper side of the housing. The filter 120 can be foldable, for example, as the hood of a child's pram, and can be easily taken from the housing for the cleaning of the device. The apparatus shown in FIG. 3, as the embodiment according to FIG. 1, can likewise be arranged on wheels so that it can be moved as a mobile unit to the place of use near the filter equipment.

As does the embodiment described in connection with FIGS. 1 and 2, the embodiment according to FIGS. 3 and 4 also makes possible an optimisation of the sieveing process, i.e. creation of the best possible sieving action together with the most gentle handling of filter material to be sieved, in that the longitudinal inclination and/or rotational speed of the sieve drum and the amount of material changed to the sieve drum to respective working conditions is optimised.

What is claimed:

1. An apparatus for separating the reusable part from the unusable part of granular filter material of a filter equipment, particularly granular activated charcoal, comprising a sieve drum rotatably mounted on a frame, means for adjusting said sieve drum in its longitudinal inclination, means for driving the sieve drum with adjustable rotary speed, and means for pneumatically withdrawing the granular filter material from the filter equipment and for supplying the granular filter material to the sieve drum, said withdrawing and supplying means comprising suction container means mounted on said frame having an inlet opening communicating with the filter equipment for receiving the granular filter material therefrom and an outlet communicating with the sieve drum, a pressure reduction pump mounted on said suction container for producing a negative pressure in the suction container, and means for closing and opening the outlet opening in a controlled periodic manner and for creating a periodic suction force on the inlet opening during the time the outlet opening is closed for adjusting the amount of filter material fed to the sieve drum per unit time.

2. An apparatus according to claim 1 in which said means for adjusting the longitudinal inclination of the sieve drum include a sub-frame pivotally mounted on the frame, said sieve drum being journalled for rotation in said sub-frame.

3. An apparatus according to claim 1, further comprising a cleaning roller extending parallel to the sieve drum and biased against the outer surface of the sieve drum.

4. An apparatus according to claim 1 in which said frame comprises wheels for providing a mobile unit including the sieve drum, the driving means, the pneumatically withdrawing and supplying means, and means for separately collecting the sieved usable and unusable filter material.

* * * * *